Figure 1:
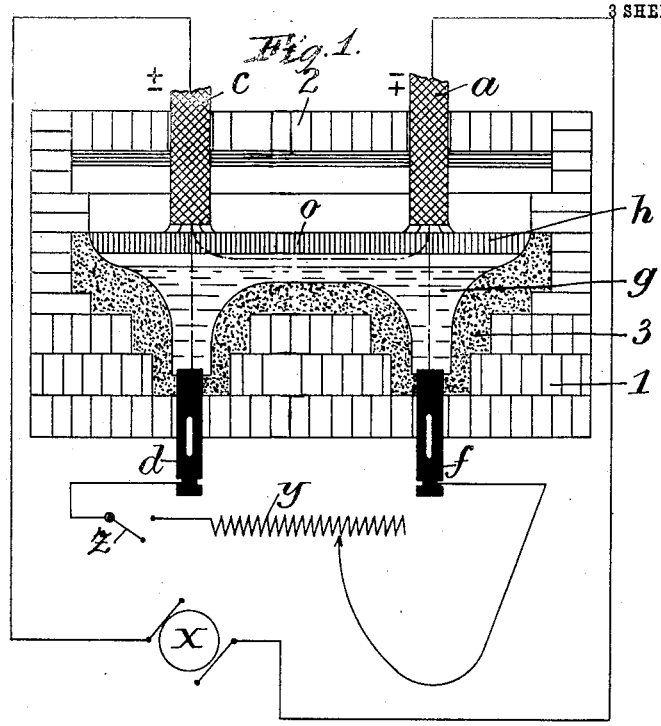

H. NATHUSIUS.
ELECTRIC MELTING AND REFINING FURNACE.
APPLICATION FILED MAY 7, 1908.

958,757.

Patented May 24, 1910.

3 SHEETS—SHEET 1.

Witnesses:
Waldo M. Chapin
James D'Antono

Inventor:
Hans Nathusius
by Rosenbaum & Stockbridge
Attys.

H. NATHUSIUS.
ELECTRIC MELTING AND REFINING FURNACE.
APPLICATION FILED MAY 7, 1908.

958,757.

Patented May 24, 1910.
3 SHEETS—SHEET 3.

UNITED STATES PATENT OFFICE.

HANS NATHUSIUS, OF FRIEDENSHÜTTE, NEAR MORGENROTH, GERMANY.

ELECTRIC MELTING AND REFINING FURNACE.

958,757.   Specification of Letters Patent.   Patented May 24, 1910.

Application filed May 7, 1908. Serial No. 431,300.

*To all whom it may concern:*

Be it known that I, HANS NATHUSIUS, engineer, subject of the King of Saxony, residing at Friedenshütte, near Morgenroth, in Germany, have invented new and useful Improvements in Electric Melting and Refining Furnaces, of which the following is a specification.

The present invention relates to an improvement in or modification of the invention described in my application for patent Serial No. 431,758, filed May 6, 1908 which refers to an electric melting and refining furnace differing from the well known furnaces used for the same purpose by the electric current (owing to its admission at different places distributed over the circumference of the melting hearth or of the material to be melted), being forced to circulate in the material to be melted or refined, and to pass through it, for the purpose of obtaining not only a hot slag which will easily enter into reactions, but also a hot metal bath which allows the most efficient chemical reactions.

The object of the present invention is to obtain the above results in the simplest possible manner by means of special methods of connection, owing to which also further new effects are obtained. Thus first of all, it is possible to concentrate the greatest heat, according to the state of the charge, either at the surface of the bath or in the metal bath itself, and secondly, when an alternating, more particularly a three-phase current is used, to produce an efficient mixing in the bath by producing a circular motion in the same by the action of the current circuits.

In well known electric furnaces the electric current flows either only through the slag cover or the surface of the bath, or the said current flows through the bath from the top downward in restricted paths, so that neither the slag cover, nor the surface of the bath, nor the melted bath itself, has currents uniformly passing through the whole cross-section and uniformly heating it.

This invention has for its object to bring about the desired distribution of the currents in the simplest manner by means of an arrangement and connection of the electrodes, which produces also some further advantages.

In the accompanying drawings, Figures 1–4 show diagrammatically vertical sections through four electric furnaces which are intended to be worked in accordance with this invention.

As in the specification hereinbefore referred to, 1 indicates the furnace closed by the arch 2, the melting hearth $g$ of which is provided with a lining of suitable refractory, strong material. The hearth has also a cupshaped form with large surface, so that the material to be refined has the largest possible surface of contact with the molten slag cover $h$. Through the arch 2 pass electrodes $a\ c$ (Figs. 1 and 2) or $a\ b\ c$ (Fig. 4) opposite which in the molten metal are arranged the cooled steel electrodes $d\ f$ (Figs. 1 and 2) or $d\ e\ f$ (Figs. 3 and 4) passing through the bottom space of the melting hearth.

As will be seen from Fig. 1, when continuous or ordinary alternating current is used, the upper electrodes $a$ and $c$ are connected to the two poles of the source of current $x$. The bottom electrodes $d\ f$ are not connected to the source of current $x$, but on the contrary are connected to each other, with the insertion of an adjustable resistance $y$ and of a switch $z$.

The following connections and, therefore, the following distributions of current are possible. When the switch $z$ is open the current passes only between the upper electrodes $a\ c$ following the path $o$. If on the contrary, the switch $z$ is closed, the current passes from the electrode $a$ to the electrode $c$, and in addition to that, or instead follows the path over the electrodes $f$, resistance $y$, electrode $d$, in accordance with Kirchhof's law.

Figure 2:
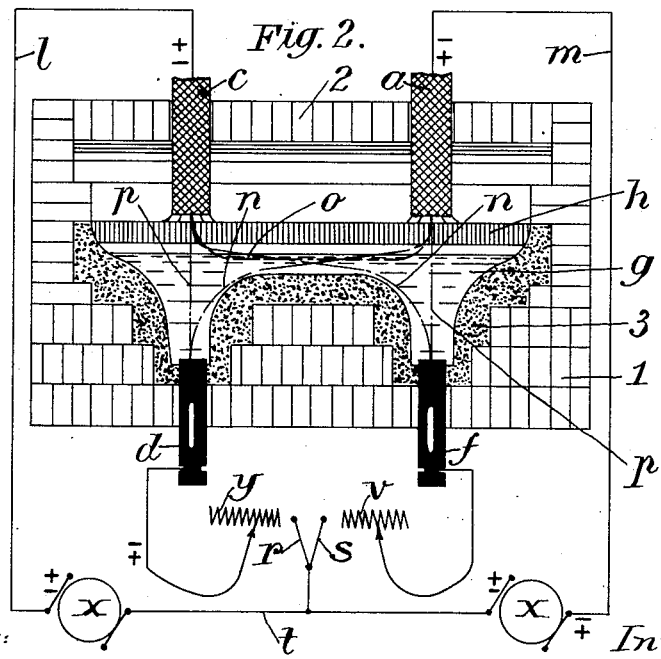
Figure 3:
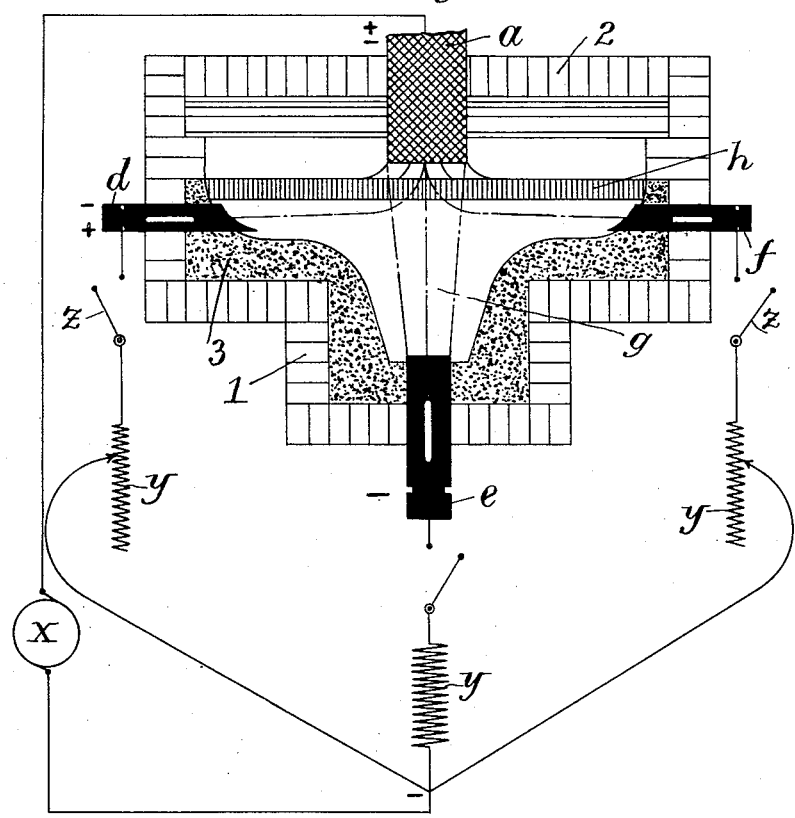

The arrangement for the use of the three wire system is shown in Fig. 2. In that case the two upper electrodes $c$ and $a$ are connected to the outer wires $l\ m$ of the source of the current $x$, while the bottom electrodes $d$, $f$, with or without resistance $y$ or $v$ and a switch $r$ or $s$ are connected through the wire $t$ to the neutral point of the source of current $x$.

In this case the following connections are possible. If we assume that both switches are open, the current will pass between the electrodes $c$ and $a$ only over the bath surface, following the path $o$. On the other hand, if the two switches $r\ s$ are closed, the current will pass also, or only, from the electrode $c$ or $a$ over the electrode $d$ or $f$, the resistances $y$ or $v$ to the neutral wire $t$. If the switch $r$ is open, and the switch s closed, the current will follow not only the path o, but also from the two electrodes c and a to the bottom electrode f (which is switched in circuit) along the paths n p, or exclusively along the path o, or n and p, according to the adjustment of the resistance y. The same applies to the bottom electrode d. The number of the bottom electrodes can be varied to suit the requirements and the shape of the furnace, the above mentioned methods of connection being retained, so that it is possible to concentrate alternately the current and its action at any desired point of the bath. This arrangement and distribution of current described for the three wire system can also be adopted for the simple continuous or alternating current, one or more electrodes being connected over the bath to one pole of the source of current in such manner that they can be switched in and out, while the other pole is connected to one or more electrodes projecting in the bath, in such manner that they can be connected or disconnected, if desired with switching in of adjustable resistances into each electrode circuit, as will be readily understood from Fig. 3 without any further explanation.

Figure 4:
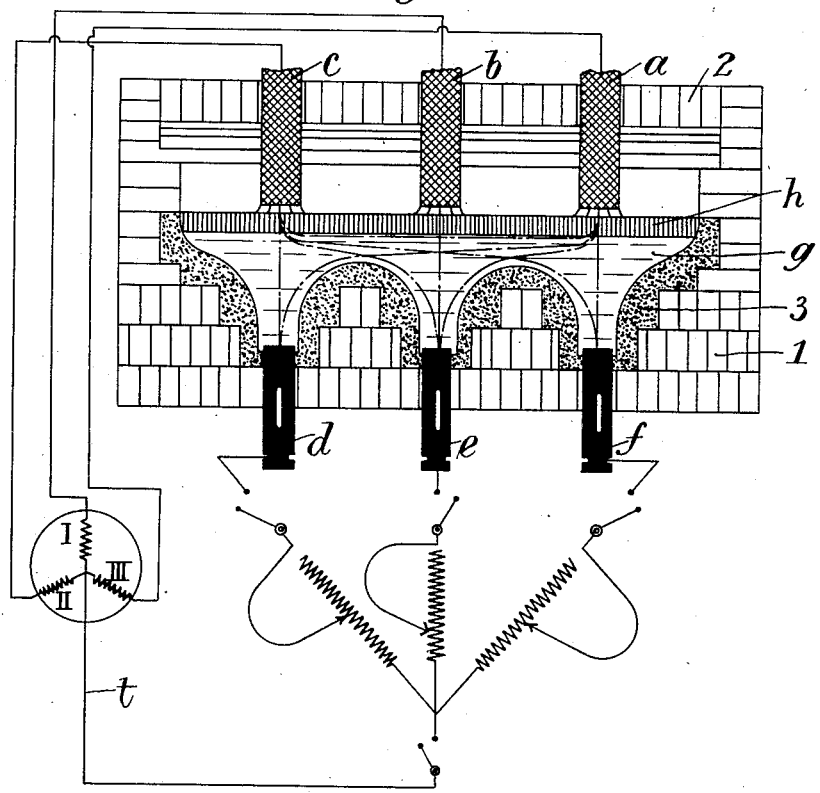

Fig. 4 shows the arrangement when polyphase, more particularly three-phase current, is used. In this arrangement, the upper electrodes c a b are connected to the three phases of the source of current, and the bottom electrodes are connected to the neutral wire t of the source of current, with the insertion, if desired, of adjustable resistances and switches as already described for the connection in Fig. 2. The working of this connection and the possibility of distributing or concentrating the circuit and its action on the different points of the bath, is the same as in the connection shown in Fig. 2, but the number of possible combinations is correspondingly greater in accordance with the greater number of the upper electrodes. In this case, as in Fig. 2, the number of the bottom electrodes need not, of course, be the same as that of the upper ones.

Obviously furnaces can be built with a manifold repetition of the above connections in groups on one and the same furnace. When alternating currents or special three-phase currents are used, rotary motion is at the same time produced in the bath owing to the action of the said currents, which produces an excellent mixing effect.

Having now particularly described and ascertained the nature of my said invention and in what manner the same is to be performed, I declare that what I claim is:—

1. In an electric furnace, a hearth, electrodes arranged above the hearth and adapted to form a voltaic arc in conjunction with the surface of the material contained therein, additional electrodes in the hearth below the level of the first named electrodes, and means for simultaneously effecting a varying distribution of the electric current flow between different of said electrodes, whereby the heat at the surface and in the body of the molten material is controlled.

2. In an electric furnace, a hearth, electrodes arranged to cause a current flow through the bulk of the material contained in said hearth, and means for varying the connections of the electrodes with one another, whereby the density of current flow between different elctrodes is varied.

3. In an electric furnace, a hearth, electrodes arranged to cause a current flow simultaneously in differing paths through material contained in said hearth, and means for varying the relative density of current along the respective paths.

4. In an electric furnace, a hearth, electrodes arranged to cause a current flow through material contained in said hearth, and means for varying the direction and density of current flow through the body of said material.

In testimony whereof I have signed my name to this specification in the presence of two subscribing witnesses.

HANS NATHUSIUS.

Witnesses:
 LOUIS KATZ,
 ERNST BLIRSCH.